(12) United States Patent
Salvisberg

(10) Patent No.: US 6,405,586 B1
(45) Date of Patent: Jun. 18, 2002

(54) DYNAMOMETER ROLLER

(76) Inventor: Marc W. Salvisberg, 855 San Anselmo Ave., San Anselmo, CA (US) 94901

( * ) Notice: Subject to any disclaimer, the term of this patent is extended or adjusted under 35 U.S.C. 154(b) by 0 days.

(21) Appl. No.: 09/493,589

(22) Filed: Jan. 31, 2000

(51) Int. Cl.$^7$ .............................. G01L 3/26; G01L 3/16
(52) U.S. Cl. ...................................... 73/117; 73/862.09
(58) Field of Search .......................... 73/117, 862.08, 73/862.09, 862.12, 116

(56) References Cited

U.S. PATENT DOCUMENTS 3,982,428 A * 9/1976 Wilson ...................... 73/126
4,044,609 A * 8/1977 Asmus ....................... 73/117
4,986,795 A * 1/1991 Storck ....................... 474/91

* cited by examiner

*Primary Examiner*—Benjamin R. Fuller
*Assistant Examiner*—Maurice Stevens
(74) *Attorney, Agent, or Firm*—Cherskov & Flaynik

(57) ABSTRACT

An improved roller 12 for a dynamometer 10 includes a plurality of equally spaced, congruent recesses 16 parallel to the longitudinal axis of the roller 12 and circumferentially positioned around the perimeter of the roller 12. The recesses 16 form a plurality of equally spaced, substantially planar, congruent surfaces 18 parallel to the longitudinal axis of the roller 12 and circumferentially positioned around the perimeter of the roller 12. The surfaces 18 engage the drive wheel of a vehicle and limit slippage and/or creepage between the drive wheel and the roller resulting in increased power transfer between the drive wheel and roller and increased dynamometer accuracy and repeatability.

30 Claims, 7 Drawing Sheets

DYNAMOMETER ROLLER

BACKGROUND OF THE INVENTION

1. Field of the Invention

The present invention related generally to dynamometers for tuning motorized vehicles and, more particularly, to devices that utilize rollers that engage the drive wheel of a motorized vehicle to determine engine power and/or produce varying load conditions.

2. Background of the Prior Art

A dynamometer is a commonly used apparatus for determining the engine power of a motorized vehicle including automobiles, trucks and motorcycles. The typical dynamometer operates by braking the rollers that the drive wheel of the vehicle engages and measuring net power of the engine acting on the vehicle drive wheel by sensing the braking power acting on the dynamometer rollers during a time period during which the drive wheel speed is decreased from an initial value to a preset final value.

The optimum measuring capability, accuracy and repeatability of the dynamometer is the direct result of maintained grippage or constant position of the rotating drive wheel in relation to the rotating dynamometer roller through the entire testing period of the engine of the motorized vehicle. Maximizing power transfer between the drive wheel and the roller, is the critical component for optimal performance of the dynamometer. Minimizing the repositioning of the rotating drive wheel relative to the rotating roller (often called "slippage" and/or "creepage") during operation of the dynamometer, maximizes power transfer between the drive wheel and rollers.

Prior art dynamometers attempt to limit slippage and/or creepage between the roller and drive wheel by providing a knurled surface upon the cylindrical surface of the roller. The knurled surface includes a series of alternating longitudinal ridges and grooves positioned parallel to the longitudinal axis of the roller and circumferentially around the perimeter of the roller.

The problem with the knurled surface is that the surface of the drive wheel engaging the roller comes into direct contact with the entirety of the corresponding area of the roller. More specifically, the rubber of the drive wheel not only contacts the ridges but also fills the adjacent grooves of the knurled surface of the roller that the drive wheel engages. This complete contact between the roller and the drive wheel surfaces causes the knurled surface to wear down and the force per unit of surface area of engagement to be minimized. Minimizing the force per unit of surface area of engagement between the roller and drive wheel, increases the slippage and/or creepage between the roller and drive wheel causing reduced power transfer and a corresponding decrease in dynamometer measuring capability, accuracy and repeatability.

A need exists for a dynamometer roller that reduces the surface area of engagement between the roller and drive wheel. Although many variations of dynamometers are available, (see U.S. Pat. Nos. 5,385,042; 5,375,461; 5,036,700; 4,246,779 and 3,516,287), none provide a roller that reduces the surface area of engagement thereby reducing slippage and/or creepage and causing an increase in power transfer between the roller and drive wheel thus optimizing the accuracy and repeatability of the dynamometer.

Another problem with a knurled surface is that the mass and corresponding inertia of the dynamometer roller is substantially the same as a smooth roller surface having the same diameter. Reducing the mass of a dynamometer roller, reduces the dynamometer response time to acceleration and/or power input changes. More specifically, should an internal combustion engine have a cylinder misfire, a reduced mass roller is more likely to respond to the reduced input power provided by the drive wheel.

A need exists for a dynamometer roller having a reduced mass that also includes a reduced surface area of engagement between the roller and the drive wheel. An added dynamometer roller feature that addresses both requirements is to remove material from the surface perimeter of the roller across the entire surface area to a predetermined depth such that the balance of the roller when axially rotated, is substantially unaffected.

SUMMARY OF THE INVENTION

It is an object of the present invention to provide a dynamometer having improved accuracy, repeatability, measuring capabilities and reduced mass.

A principal object of the present invention is to provide an improved dynamometer roller design that increases power transfer between the roller and the drive wheel of a vehicle positioned upon a portion of the roller surface. A feature of the improved roller is a reduced area of engagement between the surfaces of the roller and the drive wheel. An advantage of the improved roller is a decrease in the slippage and/or creepage between the engaging surfaces of the roller and drive wheel resulting in improved accuracy, repeatability and measuring capabilities for the dynamometer.

Another object of the present invention is to provide a plurality of spaced, substantially planar surfaces parallel to the longitudinal axis of the improved roller and circumferentially positioned around the perimeter of the roller. A feature of the improved roller is a substantially 'flatter' area of engagement between the surfaces of the roller and drive wheel. An advantage of the improved roller is a substantially uniform force exerted upon the engaging surfaces of the improved roller and drive wheel thereby increasing power transfer between the engaging surfaces.

Yet another object of the present invention is to provide a plurality of spaced recesses substantially parallel to the longitudinal axis of the improved roller and circumferentially positioned around the perimeter of the roller. A feature of the improved roller is a reduced area of engagement between the spaced surfaces and the vehicle drive wheel. An advantage of the improved roller is an increase in the number of roller edges engaging the drive wheel, and a corresponding increase in the power transfer between the planar surfaces of the roller and the drive wheel.

Still another object of the present invention is to optimize the relationship between the lateral dimensions of the planar surfaces and the recesses in the dynamometer roller surface. A feature of the improved roller is the lateral dimension of the planar surfaces being triple the lateral dimension of the recesses. An advantage of the improved roller is the increased force per unit area of engagement between the planar surfaces and the drive wheel, and increasing the power transfer between the roller and the drive wheel which improves dynamometer performance.

Another object of the present invention is to reduce the mass and corresponding inertia of the dynamometer. A feature of the improved roller is the removal of material from the roller's perimeter across the cylindrical surface of the roller to a predetermined depth. An advantage of the improved roller is increased sensitivity and reduced response time to acceleration and/or power input changes from the drive wheel of a vehicle engaging the cylindrical surface of the improved roller.

Briefly, the invention provides an improved dynamometer roller engaging the drive wheel of a vehicle, the improvement comprising a plurality of spaced recesses circumferentially positioned in an outer wall of the roller, said recesses forming a plurality of spaced, substantially planar surfaces circumferentially positioned around the perimeter of the roller, said planar surfaces ultimately engaging the drive wheel of the vehicle thereby limiting slippage and/or creepage between the drive wheel and the roller resulting in increased power transfer between the drive wheel and roller, and increased dynamometer accuracy and repeatability.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 1:
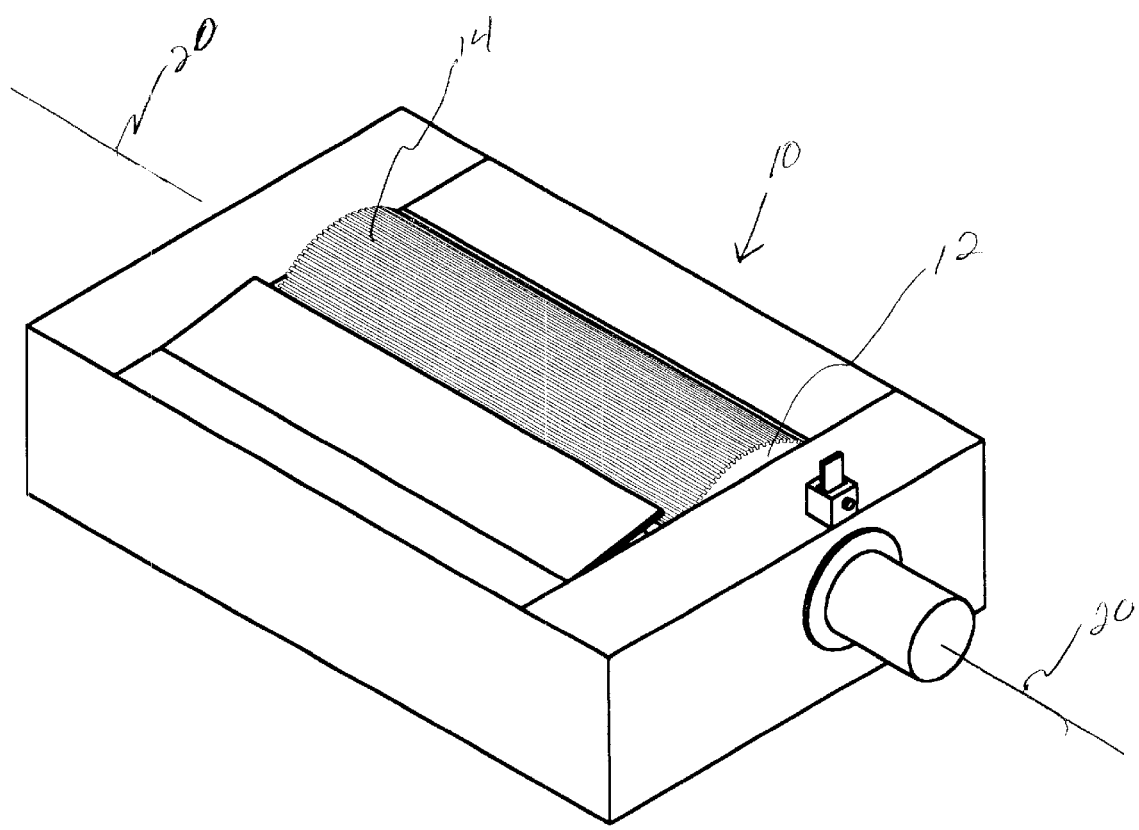
FIG. 1 is a front perspective view of the roller portion of a dynamometer in accordance with the present invention.

In the illustration provided and more particularly to FIG. 1, the reference numeral 10 designates generally a dynamometer having an improved roller 12 member that engages the drive wheel (not shown) of a motorized vehicle. The improvement includes an outer cylindrical wall or wheel engagement portion 14 of the roller 12, having a plurality of equally spaced, machined, congruent recesses 16 forming a plurality of equally spaced, substantially planar, congruent surfaces 18. The wheel engagement portion 14 may be fabricated from a myriad of materials including but not limited to carbon fibers and metals; stainless steel being the best selection due to its corrosion resistant properties. Although described as being equally spaced and congruent, the recess 16 and surfaces 18 may be totally dissimilar in configuration, design and/or spacing; however, configurations that are symetrical should be utilized to allow the roller 12 to be easily calibrated for the correct balance, a parameter that can be achieved by utilizing techniques known to those of ordinary skill in the art. As an alternative to the machined recesses 16, the surfaces 18 may be formed by tac welding projections upon the outer wall 14 of the roller 12. The projections would include a substantially planar portion that would ultimately engage the drive wheel of the vehicle being tested.

Figure 2:
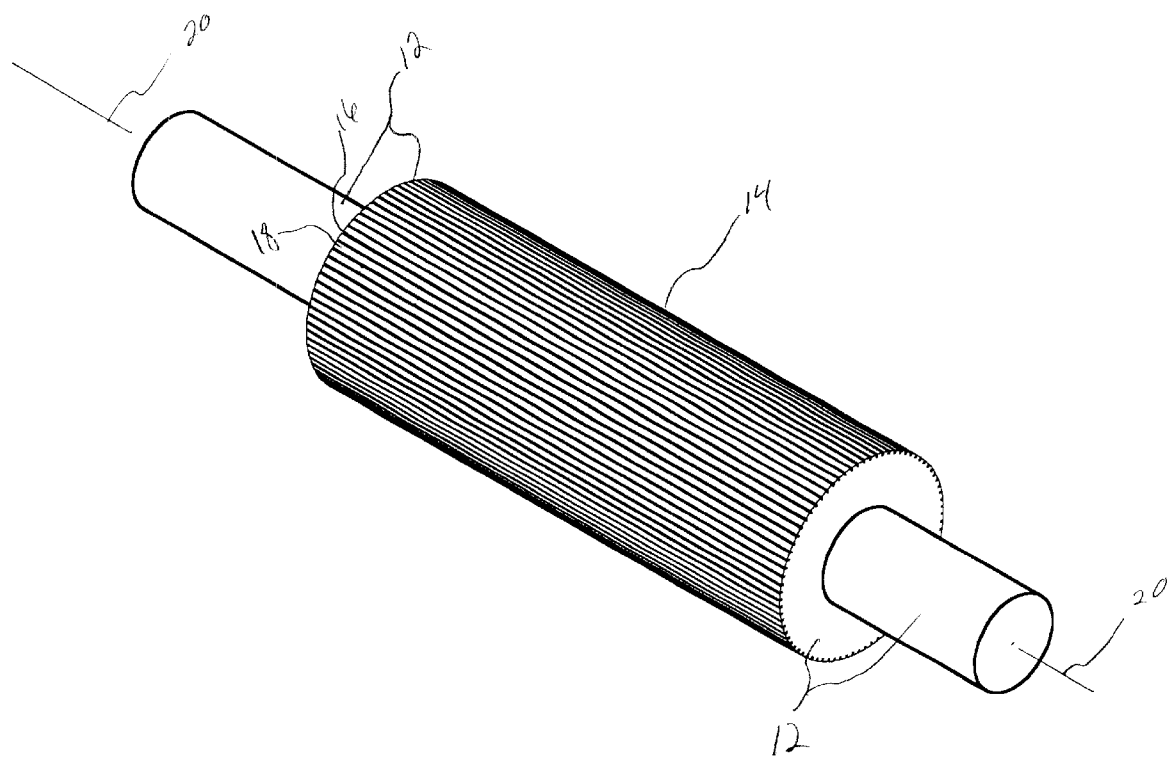
FIG. 2 is a front perspective view of a dynamometer roller in accordance with the present invention.
Figure 3:
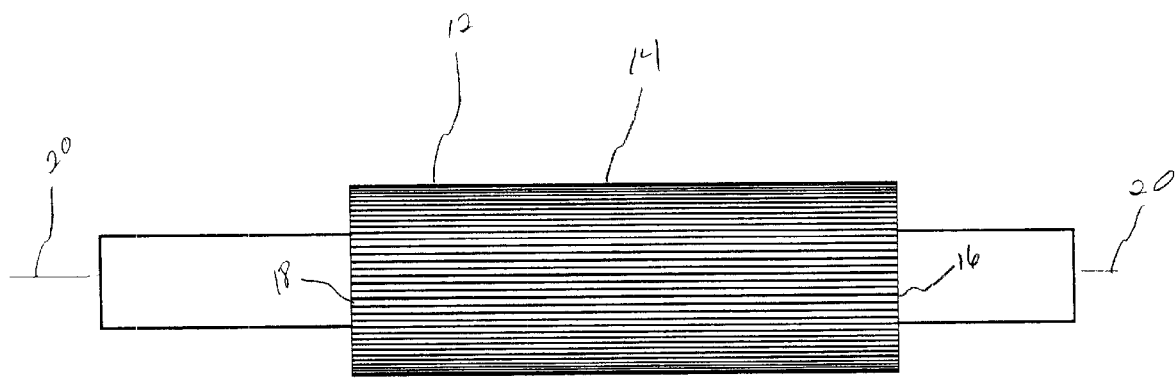
FIG. 3 is a front and/or top elevation view of the dynamometer roller depicted in FIG. 2.

Referring to FIGS. 2 and 3, the recesses 16 are parallel to the longitudinal axis 20 of the roller 12 and circumferentially positioned around the perimeter of the roller 12. The recesses are formed by the horizontal milling of the roller 12 surface by utilizing an index jig and rotating the roller 12 at the longitudinal axis. This milling technique is well known to those possessing ordinary skill. The recesses 16 extend longitudinally across the entire wheel engagement portion 14 of the roller 12 to allow the drive wheel to be positioned within a longitudinal range on the roller 12 and maintain optimal performance of the dynamometer 10.

Figure 4:
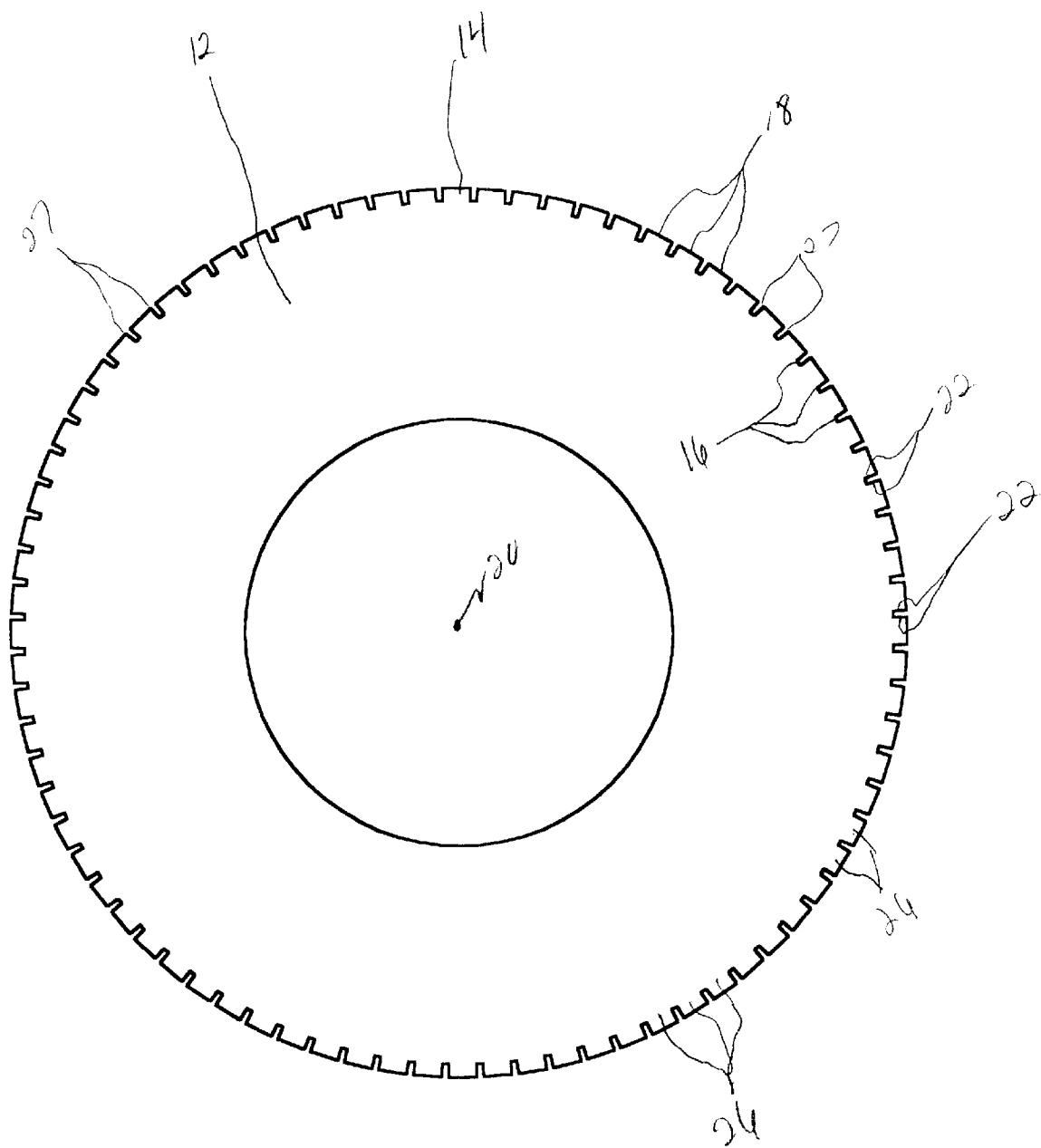
FIG. 4 is a side elevation view of the dynamometer roller depicted in FIG. 2.
Figure 5:
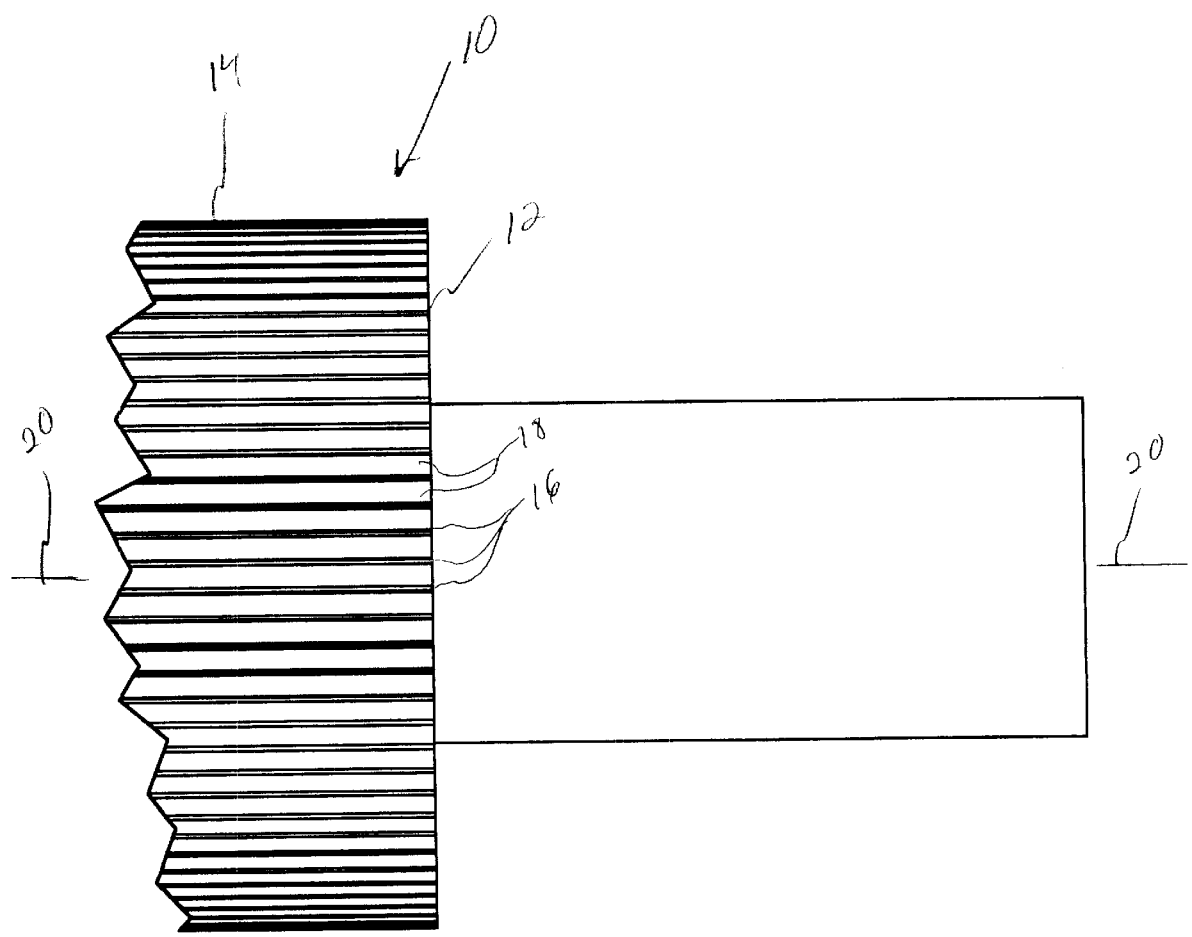
FIG. 5 is an enlarged view of a portion of the perimeter of the dynamometer roller depicted in FIG. 3.
Figure 6:
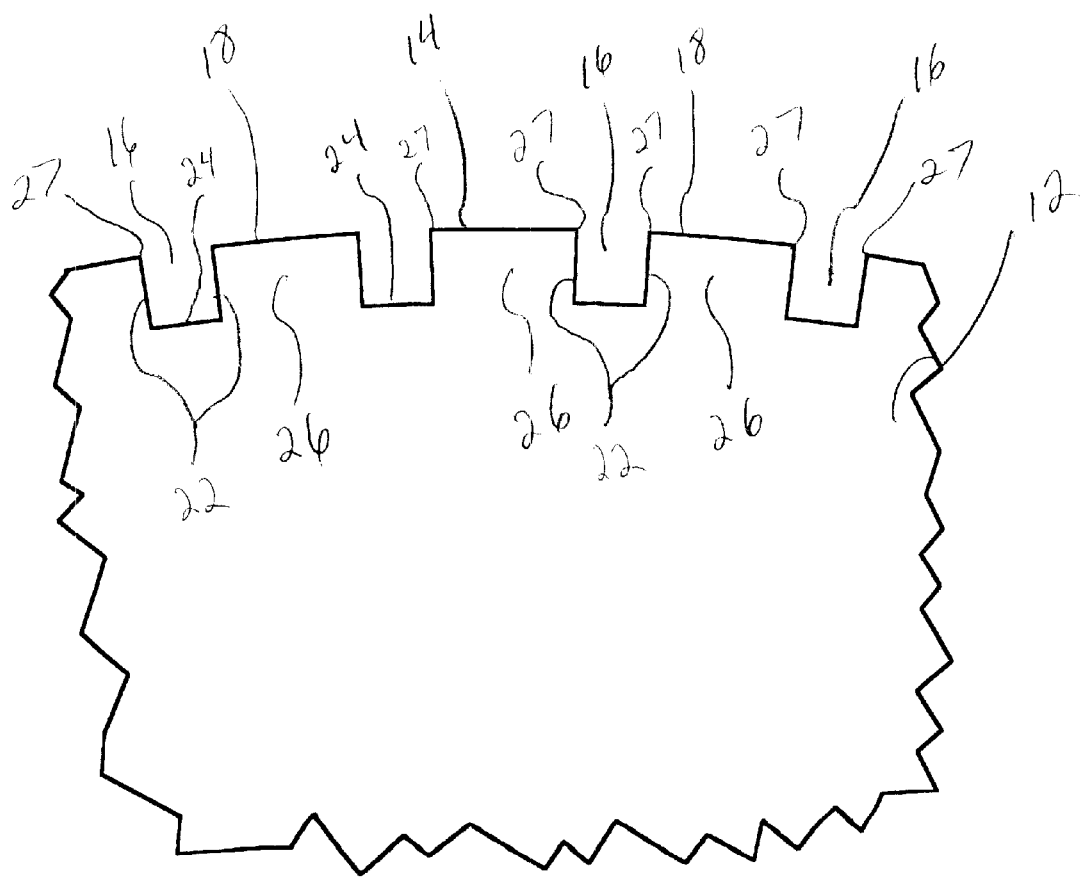
FIG. 6 is an enlarged view of a portion of the perimeter of the dynamometer roller depicted in FIG. 4.

Referring to FIGS. 4, 5 and 6, side and top elevation views of the recesses 16 are depicted in conformance with the present invention. The recesses 16 include a pair of planar side walls 22 that are substantially perpendicular to and engage adjacent planar surfaces 18 such that a substantially right angle is formed between the side wall 22 and planar surface 18. The side walls 22 are radially orientated with the longitudinal axis 28 of the roller 12 such that each side wall 22 of each recess 16, if extended, would intersect or nearly intersect the longitudinal axis 20 of the roller 12. The recesses 16 further include a bottom planar wall 24 substantially perpendicular to and engaging the side walls 22 such that a substantially right angle is formed between the side walls 22 and the planar bottom wall 24. The bottom wall 24 has a lateral dimension substantially equal to the distance separating the side walls 22 at the point of engagement with the adjacent planar surfaces 18 that form the substantially right angles mentioned above.

The planar surfaces 18 are parallel to the longitudinal axis of the roller 12 and circumferentially positioned around the perimeter of the roller 12 such that the planar surface 18 is perpendicular to a radial line intersecting the longitudinal axis of the roller 12 and the planar surface 18. The lateral dimension of the planar bottom walls 24 of the recesses 16 are approximately one-third the lateral dimension of the planar surfaces 18. Through empirical analysis, this ratio has been found to be the optimum relationship between the lateral dimensions of the recesses 16 and planar surfaces 18. However, depending on tire design and pliability of the rubber, the respective lateral dimensions of the recesses 16 and planar surfaces 18 may deviate from the three to one ratio detailed above. For example, a "soft" tire may have an excessive amount of tire surface protruding into the recesses 16 causing excessive engagement between tire protrusion and the side walls 22 of the recess 16 thereby reducing power transfer between the drive wheel of the vehicle and the roller 12, and causing the accuracy and repeatability of the dynamometer to diminish. In the aforementioned example, the lateral dimensions of the recesses 16 would have to be decreased and the corresponding lateral dimensions of the planar surfaces 18 would be increased resulting in less tire protrusion into the recess 16 and optimum performance of the dynamometer 10.

The lateral dimensions of the side walls 22 of the recesses 16 determine the depth of each recess in the roller 12. Again, via empirical confirmation, the optimum depth of each recess 16 has been found to be approximately one-third the lateral dimension of the planar surfaces 18. The lateral dimension ratio between the planar surfaces 18, and the side and bottom walls 22 and 24 form, when taking a side view of the roller 12 (FIG. 6), a series of substantially rectangular, "gear-like" teeth 26, circumferentially positioned around the perimeter of the roller 12.

The dynamometer roller 12 having a drive wheel of a vehicle setting thereupon, generates substantially uniform pressure and/or force across the engaging surfaces of the drive wheel and the substantially planar, congruent surfaces 18 by providing a plurality of planar surfaces 18 ultimately engaging the surface of the drive wheel. Essentially, the above scenario has the annular wheel perimeter engaging a plurality of planar surfaces 18 with a relatively short lateral dimension and with a substantially greater longitudinal dimension. The small lateral dimension of the planar surfaces 18 of the roller 12 provide a "flatter" surface area for the drive wheel to engage, in contrast to a continuous, cylindrical surface having no recesses 16. The "flatter" surface area of engagement improves uniform pressure across the engaging surfaces and provides multiple edges 27 that grip portions of the drive wheel tire which in turn adjusts the velocity of rotation of the tire, thereby reducing slippage and/or creepage between the engaging surfaces of the drive wheel and roller 12, and increasing power transfer between the drive wheel of the vehicle and the roller 12 of the dynamometer 10, making the dynamometer more accurately and more repeatable with its measurements.

Power transfer between the drive wheel of the vehicle and the roller 12 of the dynamometer 10, is further increased by separating the plurality of planar surfaces 18 with a plurality of congruent recesses 16. This reduces the surface area of engagement between the roller 12 of the dynamometer 10, and the drive wheel of the vehicle thus increasing the force per unit of surface area of engagement between the roller and the drive wheel. The force per unit of surface area of engagement, is set by the lateral dimension separating the side walls 22 of the recesses 16. Increasing the lateral dimension of the recesses 16, decreases the lateral dimension of the planar surfaces 18, thus increasing the force per unit of surface area of engagement and increasing the power transfer between the drive wheel and the roller 12.

In operation, the tire design and pliability of a vehicle drive wheel, will set the lateral dimensions of the planar surfaces, side walls 22 and bottom walls 24. A "soft" tire would require a planar surface 18 having a relatively larger lateral dimension than the adjacent recess walls 22 and 24. This would prevent the "soft" tire from protruding into the recesses 16 to a depth resulting in the inefficient operation of the dynamometer 10. However, a "hard" tire would require planar surfaces 18 having relatively smaller lateral dimension than for the "soft" tire, but would still have a lateral dimension greater than the side and bottom walls 22 and 24. Irrespective of the lateral dimensioning of the planar surfaces 18, and side and bottom walls 22 and 24 of the recesses 16, the relative depth of the recesses 16 must remain relatively "shallow" to avoid excessive angular displacement of the teeth 26 caused by angular forces generated by the rotating drive wheel. Excessive displacement of the teeth 26 cause reduced power transfer between the vehicle drive wheel and the roller 12 thereby diminishing dynamometer accuracy and repeatability.

Lateral dimensioning of the planar surfaces 18 and the side and bottom walls 22 and 24 of the recesses 16, is critical to maximum power transfer between the roller 12 and drive wheel, and optimum performance of the dynamometer 10. The lateral dimension for the planar surfaces 18 for the best mode of operation of the roller 12 over the broadest range of vehicle drive wheels, is approximately three-eighths inch. The corresponding lateral dimensions for the side and bottom walls 22 and 24 for the best mode of operation of the roller 12, is approximately one-eighth inch. The respective dimensions for the aforementioned lateral dimensions is constant over a broad range of roller diameters; however, a roller diameter of approximately twelve inches is best suited for the respective lateral dimensions.

Although the aforementioned description has provided details to obtain maximum power transfer between the roller 12 and drive wheel, another benefit of the recesses 16, is the removal of material from the perimeter of the roller thereby reducing the mass and corresponding inertia of the roller 12. A reduction in the inertia of the roller 12 improves the response time and measuring capability (sensitivity) of the dynamometer 10 to relatively small variations in acceleration or power provided by the drive wheel. The variations can be caused by a myriad of parameters including an engine cylinder misfiring or wear spot on a tire. Therefore, a "deeper" and "wider" recess 16 would be optimal to reducing roller mass and increasing dynamometer sensitivity; but sensitivity is secondary to maximum power transfer between the roller 12 and drive wheel. Thus, recess 16 dimensions may increase to a quantity (maximized) that does not compromise the maximum power transfer between the roller 12 and drive wheel. This maximum value must be determined via empirical testing.

Figure 7:
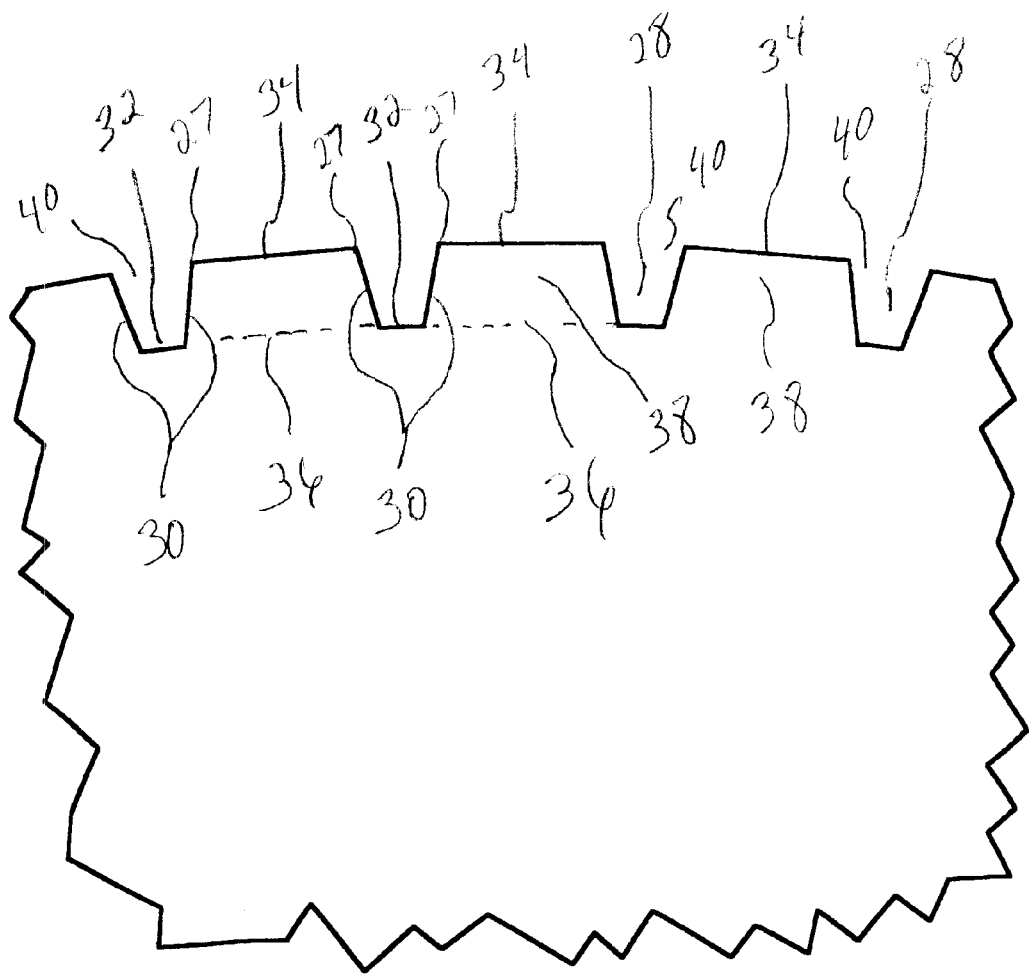
FIG. 7 is a side elevation view of an alternative embodiment of the roller depicted in FIGS. 4 and 6 in accordance with the present invention.

Referring now to FIG. 7, an alternative embodiment of the walls illustrated in the side elevation view of FIG. 5, is depicted. The recess 28 includes a pair of side walls 30 joining a bottom wall 32, and extending diagonally to join a substantially planar surface 34 such that a substantially trapezoidal configuration is formed with a base 36 integrally joined to the roller 12 and relatively longer than the planar surface 32 forming the "top" of the trapezoid. The "top" or planar surface 32 ultimately engaging the drive wheel of a vehicle.

The side walls 30 of the recess 28 join the bottom wall 32 to form an obtuse angle therebetween causing the side walls 30 to diverge (if extended) from the longitudinal axis 20 of the roller 12. The planar congruent surfaces 34 of the alternative embodiment, are positioned at the same relative positions as the planar surfaces 18 in the prior figures. More specifically, the planar surfaces 34 are parallel to the longitudinal axis of the roller 12 and circumferentially positioned around the perimeter of the roller 12 such that the substantially planar surface 34 is perpendicular to a radial line intersecting the longitudinal axis of the roller 12 and the substantially planar surface 34.

The advantage of the trapezoid configuration depicted in FIG. 7, is that it provides a "stiffer" tooth 38, more resistive to movement caused by the angular forces generated by a rotating drive wheel. Restricting movement of the tooth 38, provides for increased power transfer between the drive wheel and roller 12, and increased accuracy and repeatability for the dynamometer 10. It should be noted that although the tooth 38 configuration changes, the lateral distance separating the planar surfaces 34, remain the same. However, the lateral dimension of the side walls 30 of the recess 28 increase, and the lateral dimension of the bottom walls 32 decrease.

The foregoing description is for purposes of illustration only and is not intended to limit the scope of protection accorded this invention. The scope of protection is measured by the following claims, which should be interpreted as broadly as the inventive contribution permits.

What is claimed is:

1. An improved dynamometer roller engaging the drive wheel of a vehicle, the improvement comprising:

a plurality of spaced recesses circumferentially positioned in an outer wall of the roller, said recesses forming a plurality of spaced, substantially planar surfaces circumferentially positioned around the perimeter of the roller, said planar surfaces having larger lateral dimensions relative to said recesses, said planar surfaces ultimately engaging the drive wheel of the vehicle thereby limiting slippage creepage between the drive wheel and the roller resulting in increased power transfer between the drive wheel and roller and increased dynamometer accuracy and repeatability.

2. An improved dynamometer roller, the improvement comprising:

means for providing uniform pressure across the surface of engagement between the drive wheel of a vehicle and the roller of a dynamometer;

means for reducing the area of engagement between the roller and the drive wheel of the vehicle; and means for increasing the force per unit of surface area of engagement between the roller and the drive wheel of the vehicle, said increasing means includes means for increasing the lateral dimension of said recesses in relation to said substantially planar surfaces thereby decreasing the lateral dimension of said substantially planar surfaces.

3. The improved dynamometer roller of claim 2 wherein said means for providing uniform pressure includes a plurality of substantially planar congruent surfaces parallel to the longitudinal axis of the roller and circumferentially positioned around the perimeter of the roller.

4. The improved dynamometer roller of claim 3 wherein said substantially planar surfaces have a lateral dimension substantially triple the lateral dimension of adjacent recesses.

5. The improved dynamometer roller of claim 4 wherein said planar surfaces have a lateral dimension measuring substantially about three-eighth inch.

6. The improved dynamometer roller of claim 2 wherein said means for reducing the area of engagement includes a plurality of congruent recesses parallel to the longitudinal axis of the roller and circumferentially positioned around the perimeter of the roller.

7. The improved dynamometer roller of claim 6 wherein said recesses include a pair of planar side walls substantially perpendicular to and engaging adjacent planar surfaces, and a planar bottom wall substantially perpendicular to and engaging said side walls, said bottom wall having a lateral dimension substantially equal to the distance separating said side walls at the point of engagement with adjacent planar surfaces.

8. The improved dynamometer roller of claim 7 wherein said recesses have lateral dimension measuring substantially about one-eighth inch.

9. The improved dynamometer roller of claim 2 wherein said means for increasing the force per unit surface area includes increasing the lateral dimension of said recesses in relation to said substantially planar surfaces thereby decreasing the lateral dimension of said substantially planar surfaces.

10. A method for improving power transfer between the drive wheel of a vehicle and the roller of a dynamometer comprising the steps of:

A. providing substantially uniform pressure across the engaging surfaces of the drive wheel of the vehicle setting upon the roller of a dynamometer;

B. reducing the area of engagement between the roller and the drive wheel of the vehicle; and C. increasing the force per unit of surface area of engagement between the roller and the drive wheel of the vehicle, said force increasing step including the step of increasing the lateral dimension of said recesses in relation to said substantially planar surfaces thereby decreasing the lateral dimension of said substantially planar surfaces.

11. The method for improving power transfer of claim 10 wherein the step of providing substantially uniform pressure further includes the step of providing a plurality of substantially planar, congruent surfaces parallel to the longitudinal axis of the roller and circumferentially positioned around the perimeter of the roller such that the substantially planar surface is perpendicular to a radial line intersecting the longitudinal axis of the roller and the substantially planar surface.

12. The method for improving power transfer of claim 11 wherein said substantially planar surfaces have a lateral dimension substantially triple the lateral dimension of adjacent recesses.

13. The method for improving power transfer of claim 12 wherein said substantially planar surfaces have a lateral dimension measuring substantially about three-eighth inch.

14. The method for improving power transfer of claim 10 wherein the step of reducing the area of engagement further includes the step of providing a plurality of congruent recesses parallel to the longitudinal axis of the roller and circumferentially positioned around the perimeter of the roller.

15. The method for improving power transfer of claim 14 wherein said recesses include a pair of planar side walls substantially perpendicular and engaging adjacent planar surfaces, and a bottom planar wall substantially perpendicular to and engaging said side walls, said bottom wall having a lateral dimension substantially equal to the distance separating said side walls at the point of engagement with adjacent planar surfaces.

16. The method for improving power transfer of claim 14 wherein said recesses have a lateral dimension measuring substantially about one-eighth inch.

17. The method for improving power transfer of claim 10 wherein the step of increasing the force per unit of surface area further includes the step of increasing the lateral dimension of said recesses in relation to said substantially planar surfaces thereby decreasing the lateral dimension of said substantially planar surfaces.

18. A method for improving dynamometer performance, comprising the steps of:

A. reducing the area of engagement between a roller member of the dynamometer and the drive wheel of a vehicle, said area reducing step including the step of increasing the lateral dimension of recesses thereby decreasing the lateral dimension of corresponding substantially planar surfaces; and B. reducing the mass of said roller member.

19. The method for improving dynamometer performance of claim 18 wherein the step of reducing the area of engagement further includes the step of providing a plurality of recesses circumferentially positioned around the perimeter of said roller member.

20. The method of improving dynamometer performance of claim 18 wherein the step of reducing the mass of said roller member further includes the step of maximizing the dimensions of said recesses.

21. The method of claim 18 wherein said mass reducing step includes the step of increasing the depth of said recesses.

22. The method of claim 18 wherein said mass reducing step includes the step of configuring said recesses to form rectangularly shaped teeth.

23. A method for increasing accuracy and repeatability for a dynamometer, said method comprising the steps of:

A. providing a plurality of spaced recesses circumferentially positioned in an outer wall of a roller, said recesses forming a plurality of spaced surfaces circumferentially positioned about the perimeter of the roller; and B. configuring said recesses to form diverging side walls that provide spaced surfaces more resistive to movement caused by the angular forces generated by a rotating drive wheel engaging said spaced surfaces whereby more power is transferred from the drive wheel to the roller.

24. The method of claim 23 wherein said spaced surfaces are substantially planar.

25. The method of claim 23 wherein the step of configuring said recesses includes the step of providing spaced surfaces having lateral dimensions smaller than a corresponding base.

26. The method of claim 23 wherein the step of configuring said recesses includes the step of providing a stiffer tooth more resistive to movement.

27. The method of claim 23 wherein the step of configuring said recesses includes the step of providing trapezoidal shaped teeth.

28. The method of claim 27 wherein said trapezoidal shaped teeth include a planar top and a base integrally joined to the roller.

29. The method of claim 28 wherein said planar top has a smaller lateral dimension than the corresponding lateral dimension of said base.

30. The method of claim 23 wherein the step of providing a plurality of spaced recesses includes the step of increasing the lateral dimension of said recesses in relation to said spaced surfaces thereby decreasing the lateral dimension of said spaced surfaces.

\* \* \* \* \*